(12) United States Patent
Weiss et al.

(10) Patent No.: US 7,700,903 B2
(45) Date of Patent: Apr. 20, 2010

(54) METHOD AND APPARATUS FOR THE AUTO-FOCUSSING INFINITY CORRECTED MICROSCOPES

(75) Inventors: Adam Weiss, Pickering (CA);
Alexandre Obotnine, Toronto (CA);
Andrew Lasinski, Mississauga (CA)

(73) Assignee: WDI Wise Device Inc., Toronto (CA)

( * ) Notice: Subject to any disclaimer, the term of this patent is extended or adjusted under 35 U.S.C. 154(b) by 96 days.

(21) Appl. No.: 11/760,973

(22) Filed: Jun. 11, 2007

(65) Prior Publication Data

US 2008/0002252 A1 Jan. 3, 2008

Related U.S. Application Data

(60) Provisional application No. 60/804,335, filed on Jun. 9, 2006.

(51) Int. Cl.
*G02B 21/00* (2006.01)
(52) U.S. Cl. .............. 250/201.2; 250/201.3; 250/201.4; 356/4.04; 359/383
(58) Field of Classification Search .............. 250/201.2, 250/201.3, 201.4; 359/368, 382, 383, 393
See application file for complete search history.

(56) References Cited

U.S. PATENT DOCUMENTS

| 4,687,913 | A | | 8/1987 | Chaban | |
|---|---|---|---|---|---|
| 5,604,344 | A | * | 2/1997 | Finarov | 250/201.3 |
| 5,633,491 | A | * | 5/1997 | Kasdan | 250/201.3 |
| 7,016,110 | B2 | | 3/2006 | Leblans | |
| 7,084,383 | B2 | * | 8/2006 | Horiuchi et al. | 250/201.2 |
| 2004/0113043 | A1 | * | 6/2004 | Ishikawa et al. | 250/201.4 |
| 2008/0054156 | A1 | * | 3/2008 | Fomitchov | 250/201.3 |

FOREIGN PATENT DOCUMENTS

WO 03060589 7/2003

* cited by examiner

*Primary Examiner*—Georgia Y Epps
*Assistant Examiner*—Tony Ko
(74) *Attorney, Agent, or Firm*—Borden Ladner Gervais LLP; Jeffrey W. Wong

(57) ABSTRACT

The invention is directed at a method and apparatus for auto-focusing an infinity corrected microscope. Light beams are directed and then converged towards a specimen of interest and at least one image is formed from the reflected light. The image, or images, are then reviewed and calibration measurements are retrieved from the image. These calibration measurement are then used to determine focusing measurements which are used to auto-focus the microscope.

21 Claims, 13 Drawing Sheets

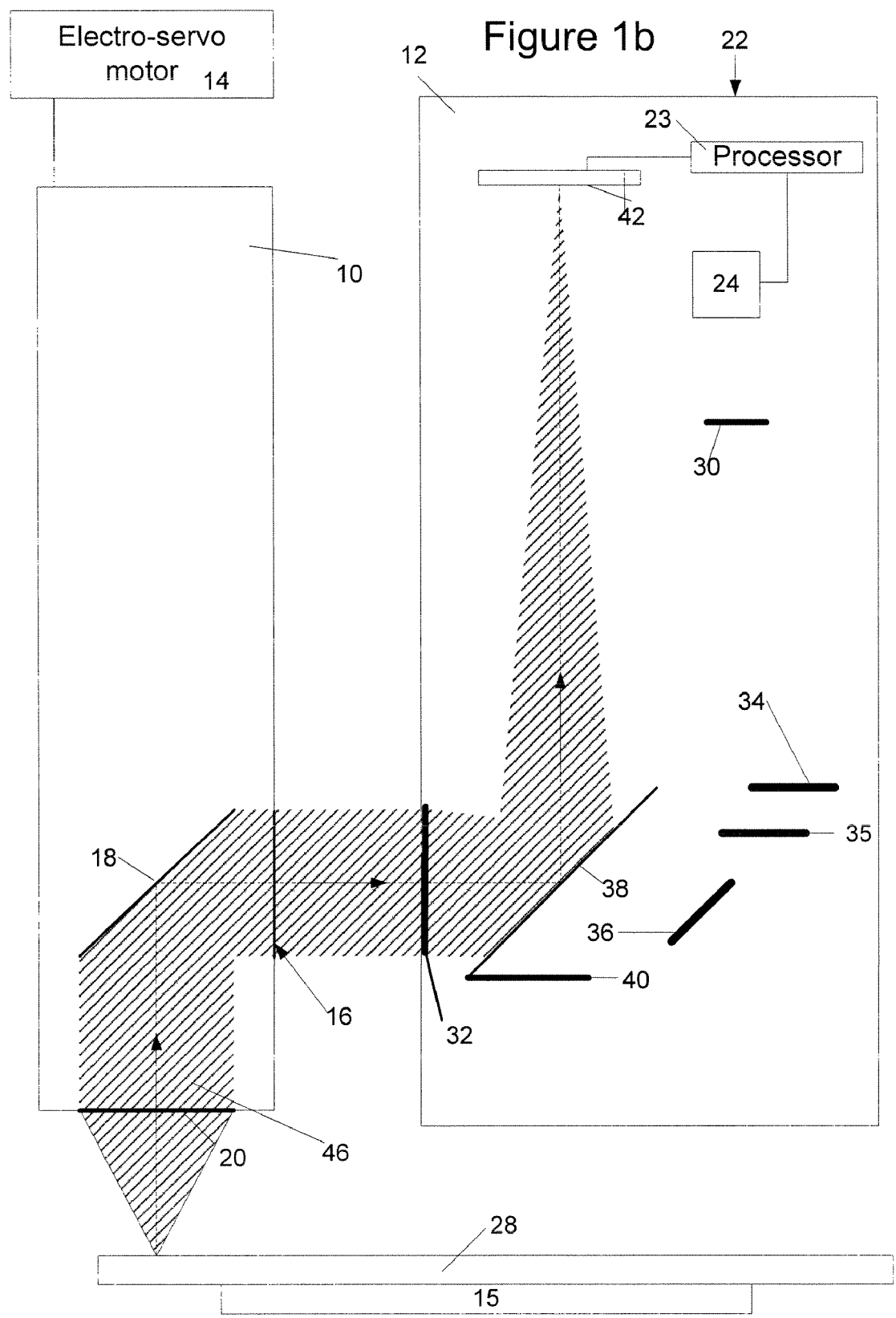

US 7,700,903 B2

METHOD AND APPARATUS FOR THE AUTO-FOCUSSING INFINITY CORRECTED MICROSCOPES

CROSS REFERENCE TO RELATED APPLICATIONS

This application claims the benefit of priority of U.S. Provisional Patent Application No. 60/804,305 filed Jun. 9, 2006, which is incorporated herein by reference.

FIELD OF THE INVENTION

The present invention relates generally to optical microscopes. More particularly, the present invention relates to a method and apparatus for auto-focusing infinity corrected microscopes.

BACKGROUND OF THE INVENTION

In the field of optical microscopy, in order to obtain a meaningful image, the microscope must be focused on the object, or specimen, being examined. During the time that the microscope is focusing on the specimen, use of the microscope is unavailable. For this reason, numerous efforts have been made to minimize focusing time, as well as to automate the process. This is generally referred to as auto-focusing (AF).

Since the introduction of the automated optical inspection (AOI) of media, AF has become more prevalent in the industry. AOI instruments are broadly used and, in particular, have become instrumental in the inspection of flat panel displays (FPD) during the manufacturing process and the inspection of silicon wafers during the production of integrated circuits. In both of these cases, the specimen being inspected is very large in comparison to the field of view of the microscope which is typically 0.5 mm by 0.5 mm.

In order for the microscope to examine specimens which are larger than its field of view, two techniques have generally been employed. A first technique is performed by focusing the microscope on previously identified spots which are suspected to be defective while the second technique is to systematically scan the entire specimen. Efficiently of both of these AOI techniques is severely restricted by the performance of presently available AF equipment.

It is, therefore, desirable to provide a novel method and apparatus for auto-focusing infinity corrected microscopes.

SUMMARY OF THE INVENTION

It is an object of the present invention to obviate or mitigate at least one disadvantage of previous methods and apparatus for auto-focusing infinity corrected microscopes.

In one aspect of the invention, there is provided a method and apparatus for determining the distance and direction in which an infinity corrected microscope should be moved in order to be focused on a specimen. By retrieving and the processing calibration measurements from at least one image created by reflecting light off the specimen, distance and direction measurements can be calculated and then transmitted to an electro-servo-motor to move either the microscope, the microscope objective lens or the stage upon which the specimen rests, to be re-positioned in order to more clearly focus the microscope on the specimen.

The calculations are performed after determining certain characteristics of the calibration measurements. This includes but is not limited to the size and pattern of various parts of the images. The calculations assist in determining the distance that the specimen is away from the lens of the microscope. This process finds use in various types of specimens including TFT arrays or even simple, un-patterned piece as of thin glass substrates.

In a first aspect, the present invention provides a method of auto-focusing an infinity corrected microscope on a specimen comprising creating an image of said specimen; processing the image to retrieve calibration measurements; calculating a distance measurement from the calibration measurements; calculating a direction measurement from the calibration measurements; and transmitting distance and direction measurements to a motor to move the microscope in accordance with the distance and direction measurements.

In a further embodiment, there is provided apparatus for auto-focusing an infinity-correct microscope on a specimen comprising a sensor including a light source for providing a plurality of light beams; a plurality of optic elements for producing a converging light directed at the specimen and for creating an image based on light reflected off the specimen as a result of the converging light; a focal plane array for displaying the image; and a processor for calculating auto-focusing measurements for the infinity corrected microscope based on the image.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1b is a schematic diagram of the apparatus of FIG. 1a when light is reflected off the specimen;

FIG. 2a is a set of drawings illustrating locations where light is reflected off a specimen;

FIG. 2b is a series of images produced as a result of the reflections of FIG. 2a;

DETAILED DESCRIPTION

Generally, the present invention provides a method and system for auto-focusing infinity corrected microscopes. The invention find particular use in Thin Film Transistor (TFT)

array inspection, photolithography mask inspection, silicon wafer inspection and micromachining and coordinate measuring machines (CMM).

Figure 1A:
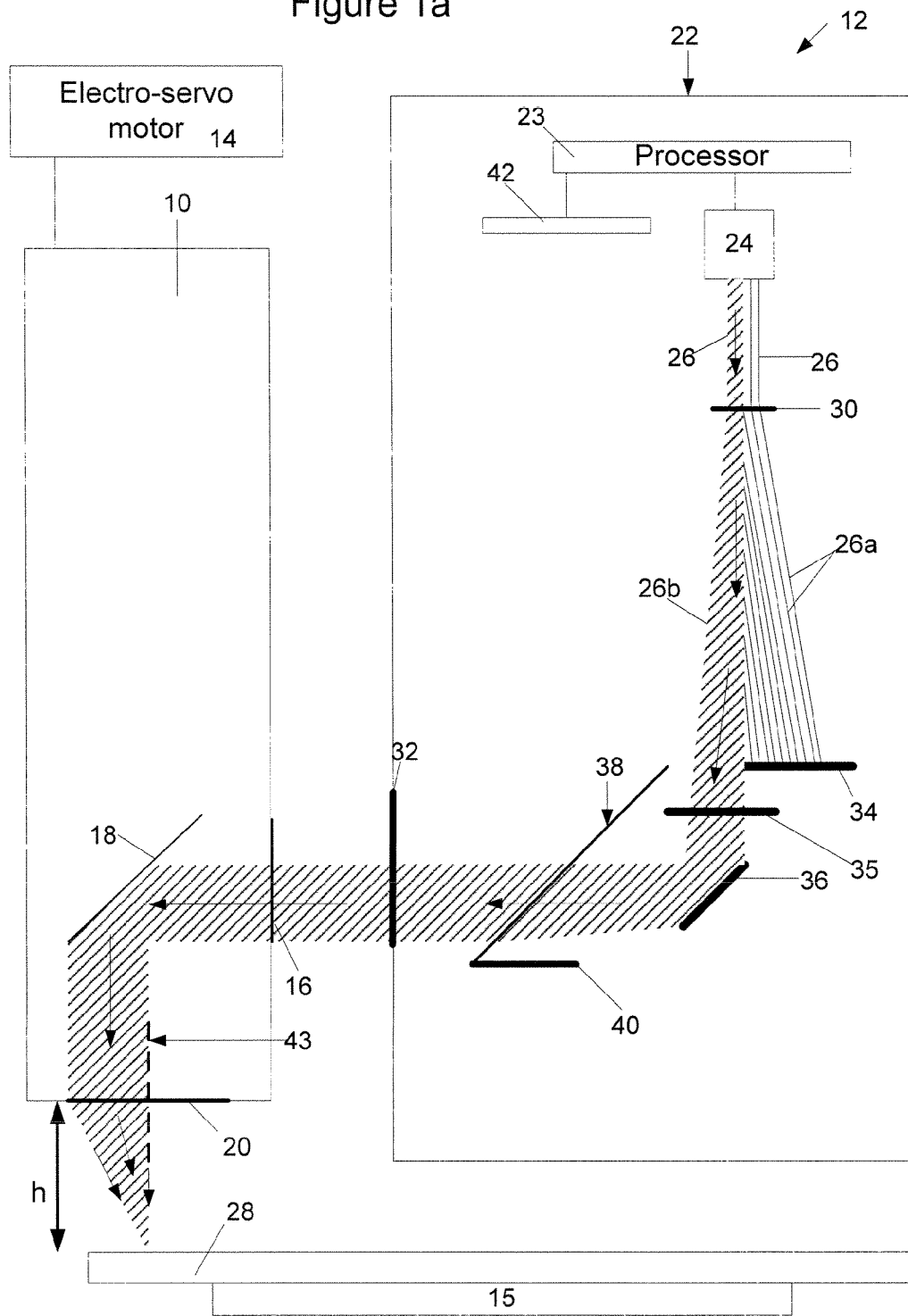
FIG. 1a is a schematic diagram of apparatus for auto focusing an infinity corrected microscope showing light being directed at a specimen.
Figure 1C:
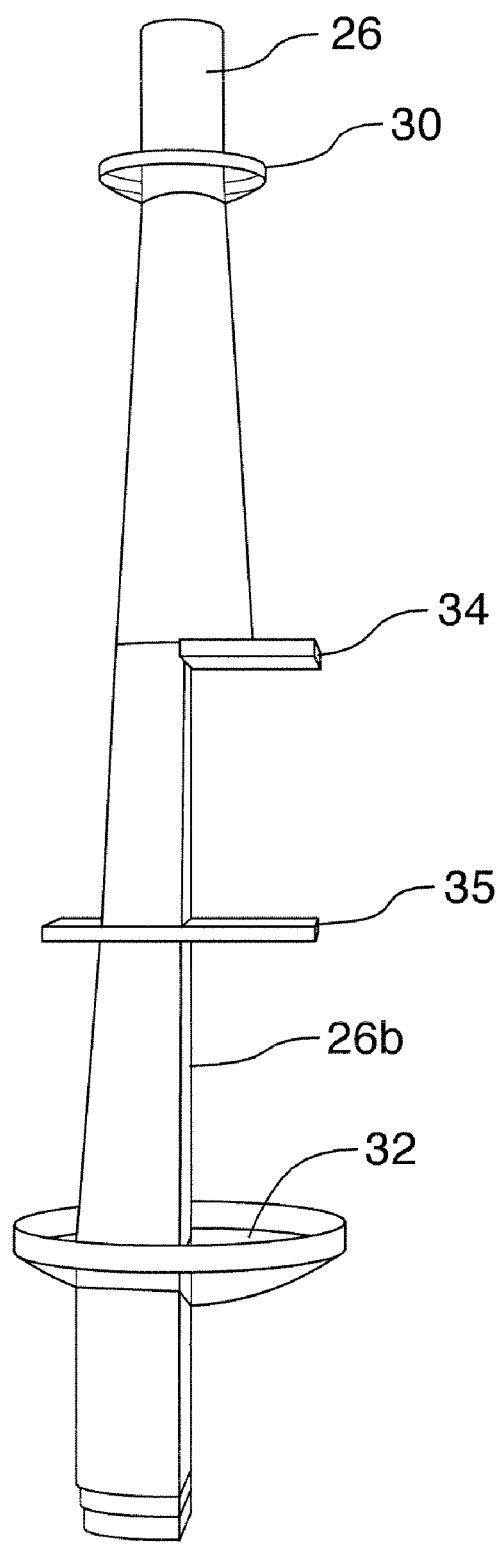
FIGS. 1c and 1d are three-dimensional diagrams for the light beam.
Figure 1D:
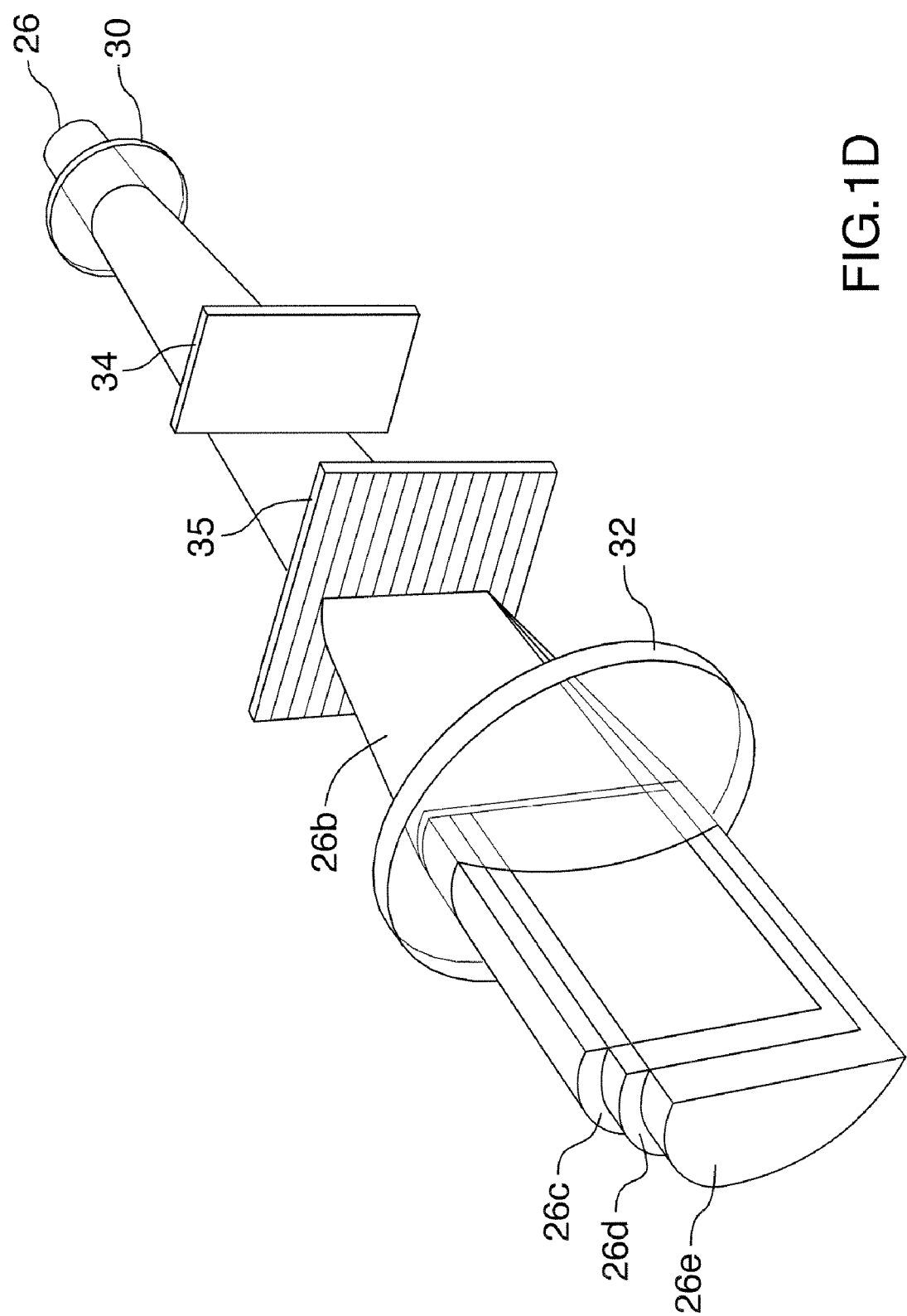

Turning to FIGS. 1a to 1d, schematic diagrams of an embodiment of an auto-focusing apparatus for use with an infinity corrected microscope is shown. FIG. 1a provides a schematic view of the apparatus providing an outgoing light beam, FIG. 1b is a schematic view of a reflected light beam after the outgoing light beam has been reflected off a specimen and FIGS. 1c and 1d are three-dimensional views of the outgoing light beam.

In FIG. 1a, an infinity corrected microscope 10 is shown with an auto-focusing apparatus 12, such as a sensor. Although shown separately, it will be understood that the apparatus 12 can be integrated within or mounted to the microscope 10 and is typically an accessory for the microscope 10.

The microscope 10 includes an optical port 16, an optical port beam splitter 18 and an objective lens 20. An electro-servo motor 14 is attached to the microscope 10 in order to move the microscope 10, or portions thereof, in a vertical direction in order to focus the microscope 10 after receiving a signal from the apparatus 12. Alternatively, the electro-servo motor 14 can be connected to a stage 15 upon which a specimen 28 is located in order to move the specimen 28, in a vertical direction, with respect to the microscope 10 to focus the microscope 10. As will be understood, only selected parts of the microscope 10 are shown in FIGS. 1a and 1b such that FIGS. 1a and 1b do not represent all parts required for operation of the microscope 10 but those parts which are required for use with the invention.

The apparatus 12 includes a sensor housing 22 which houses a processor 23 connected to a light source 24, preferably a laser light source, and a focal plane array 42 such as a charge-coupled device (CCD) or Complementary Metal Oxide Semiconductor (CMOS) area imager. The focal plane array 42 can be a line scan or an area scan focal plane array. The light source 24 provides a plurality of light beams 26 to illuminate a pattern on the specimen 28, as will be discussed below.

In this embodiment, the sensor 12 further includes a first lens 30, a second lens 32, an aperture stop 34, a diffraction grating 35, a steering mirror 36, a beam splitter 38 and an optically black pad 40. In the current embodiment, the first lens 30 is separate from the light source 24, as shown in FIG. 1a. Alternatively, the first lens 30 can be integrated with the light source 24.

The first lens 30 and the second lens 32 are used to expand the diameter of the light beams 26 to match a maximum diameter of an entry pupil of the microscope objective lens 20. Entry pupil diameters of a microscope objective lens 20 can vary depending on its magnification and design. Typically a microscope 10 includes multiple objective lens 20 which are periodically rotated depending on the specimen 28 being examined.

In the following example, it is assumed that the electro-servo motor 14 is connected to the microscope 10.

Figure 4:
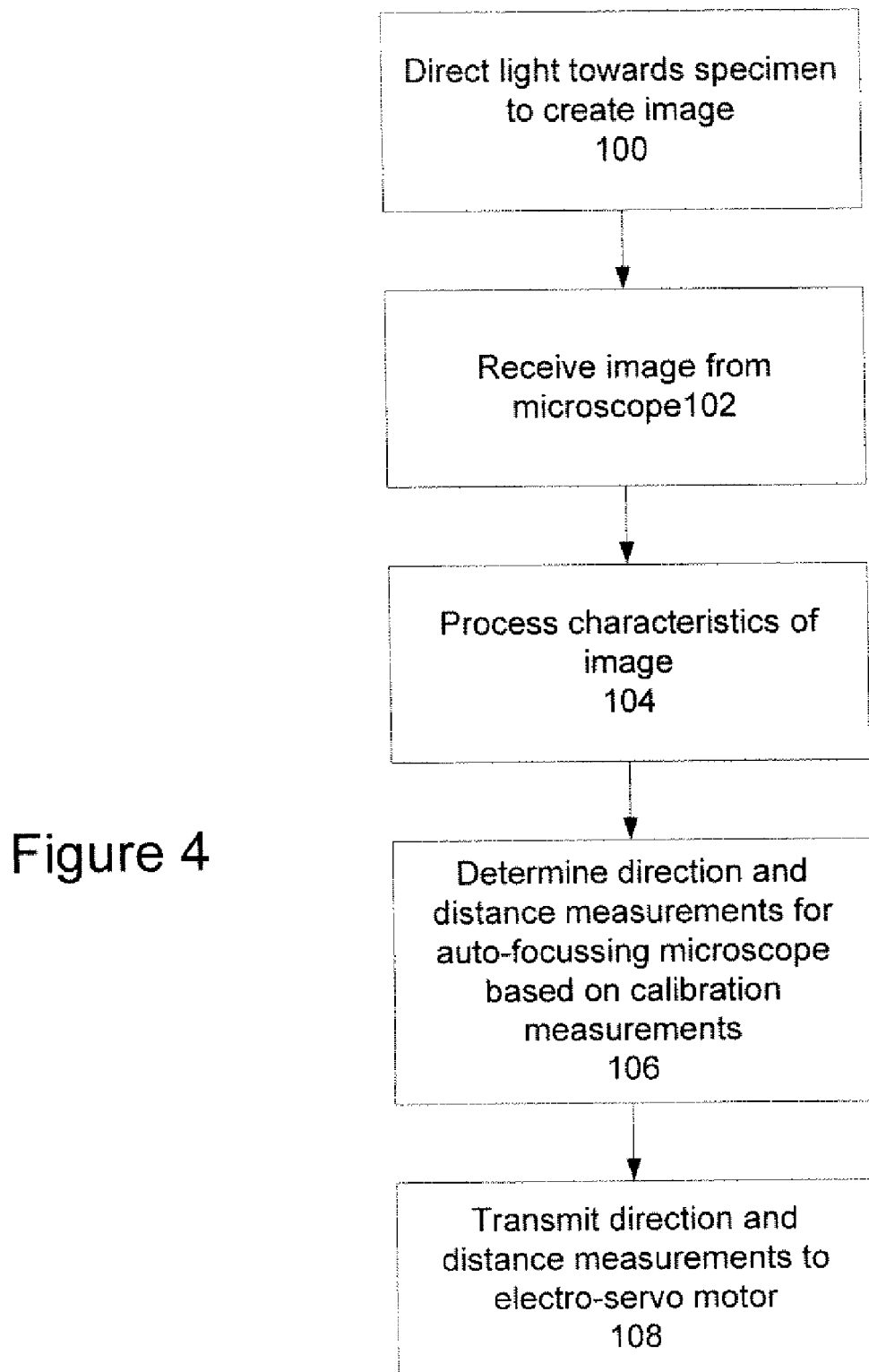
FIG. 4 is a flowchart outlining a method of auto-focusing an infinity corrected microscope.

In operation, as shown in the flowchart of FIG. 4, a light beam 26 is transmitted from the laser light source 24 towards the specimen 28 in order to create and obtain an image, such as an image of reference dots, to be used for focusing the microscope 10 (step 100). The light beam 26 is directed towards the first lens 30 which diverges the light beam 26 with a portion of the diverged light beam 26a directed towards the aperture stop 34 which causes the light beam 26 to be bisected. Due to the aperture stop 34, the bisected light beam, or bisected portion, 26b is shaped as a half-cone.

The bisected light beam 26b is passed through the diffraction grating 35, preferably a holographic grating, which splits the bisected beam 26b into a plurality of half-conical shaped light beams 26c, 26d and 26e, as more clearly shown in FIG. 1d. Although only three separate light beams are shown in FIG. 1d, it will be understood that the diffraction grating 35 can split the bisected light beam 26b into any number of light beams. Alternatively, if only one bisected light beam is required, the diffraction grating 35 can be removed. If the specimen 28 is of uniform material—such as un-patterned glass—one light beam sufficient for focusing the microscope 10. Use of the diffraction grating 35 to produce the plurality of light beams is advantageous in case of patterned specimen such as TFT arrays as discussed below.

The plurality of light beams 26c to 26e are then transmitted to the second lens 32 which collimates the plurality of bisected light beams 26c to 26e. In the current embodiment, the bisected light beams 26c to 26e are directed to the second lens 32 via the steering mirror 36. As the bisected light beams 26c to 26e pass through the beam splitter 38, which is preferably a half mirror, some of the light is reflected towards the black pad 40 which absorbs or attenuates any residual light that is reflected by the beam splitter 38 in order to not allow this reflected light to adversely affect operation of the sensor 12.

Alternatively, as shown in FIGS. 1c and 1d, the bisected light beams 26c to 26e can be transmitted directly from the diffraction grating 35 to the second lens 32.

After being collimated, the light beams 26c to 26e are passed through the optical port 16 of the microscope 10 where they are directed towards and through the objective lens 20.

Figure 1E:
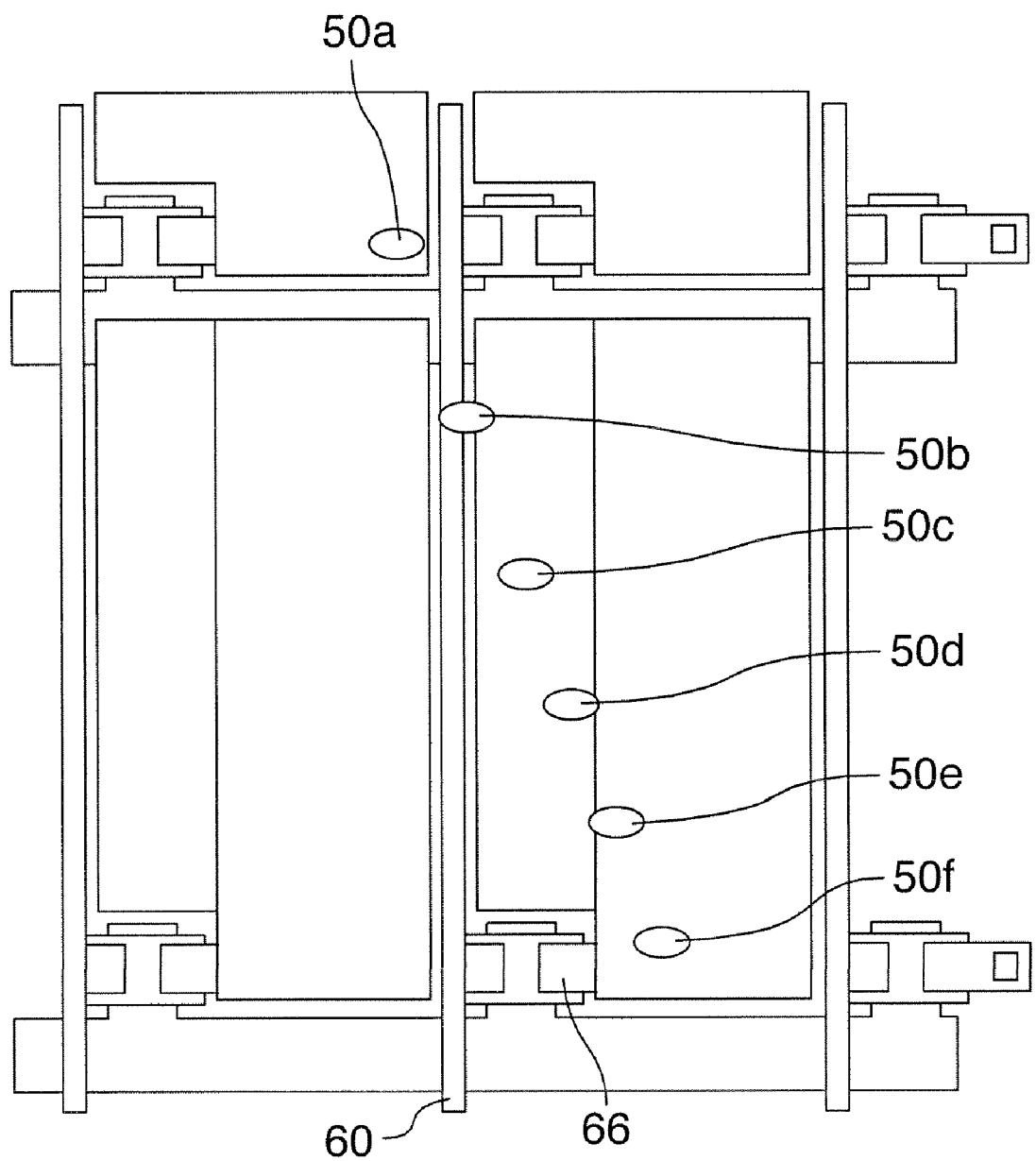
FIG. 1e is a schematic top view of a specimen having multiple light beams directed at its surface.
Figure 1F:
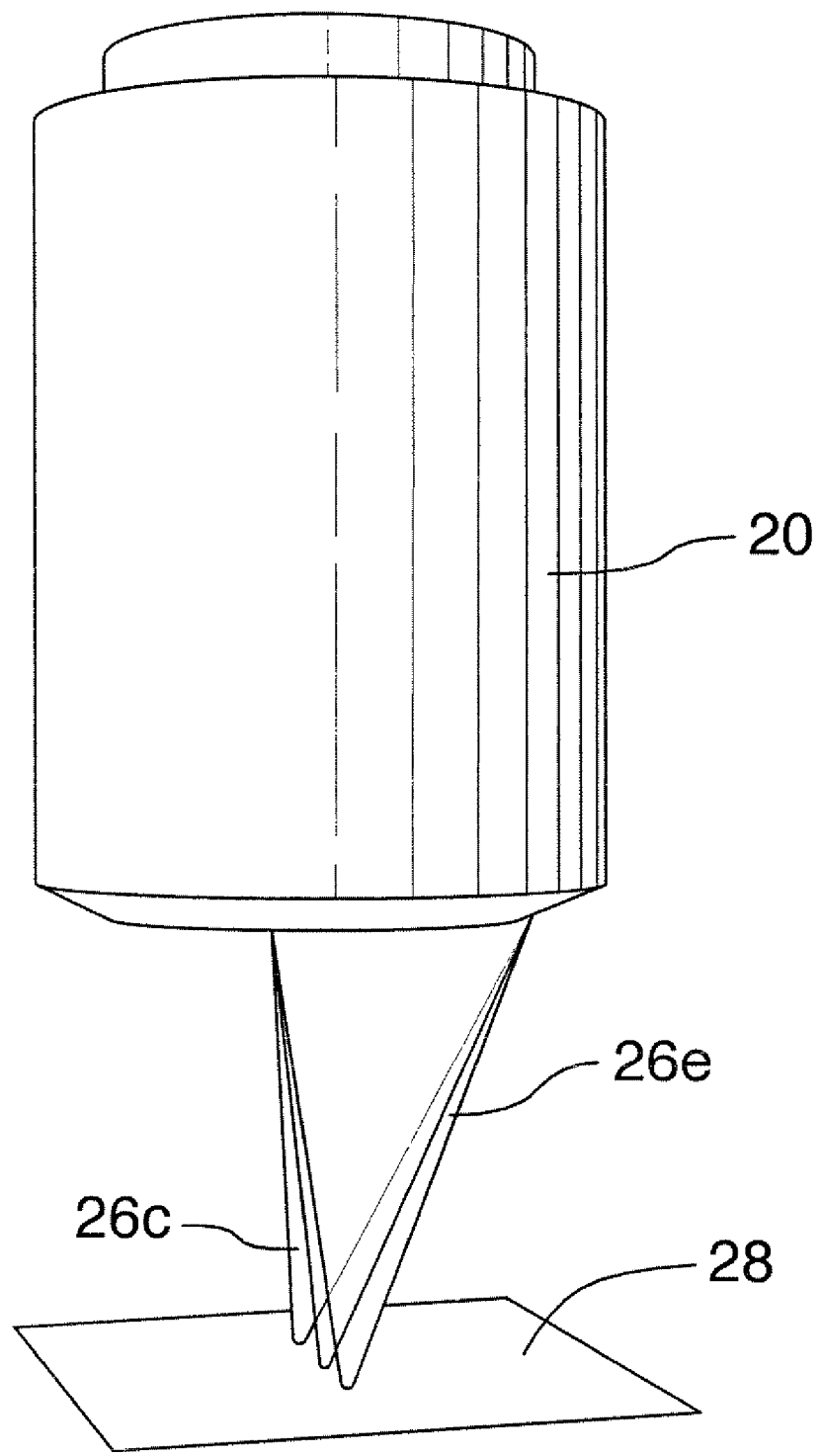
FIG. 1f is a schematic diagram of a set of three light beams directed towards a specimen.

In one embodiment, the light beams 26c to 26e are directed from the optical port 16 to the optical port beam splitter 18 which converges the light beams 26c to 26e towards the objective lens 20. The objective lens 20, having an optical axis 43, then directs the light beams 26c to 26e towards the specimen 28, as shown in FIGS. 1a and 1f. The light beams 26c to 26e directed by the objective lens 20 have a half-conical shape and provide individual converging light beams 40, each having a height, h, directed at the specimen 28. By having the light beams 26c to 26e directed through the objective lens 20, the image, which is to be used in focusing the microscope 10, is derived from a position directly under the objective lens 20.

In the embodiment shown, the specimen 28 is placed a distance h away from the objective lens 20 such that the tip of the conical converging light beams 40 hits the surface of the specimen 28. As can be seen, the converging light beam 40 shares an axis with the objective lens 20.

Turning to FIG. 1b, a schematic diagram showing the converging light being reflected off the specimen 28 to create an image is shown. After being reflected off the specimen 28, the reflected light beam, or beams, 46 is/are directed back towards, and through, the objective lens 20 into the microscope 10 to produce an image on the focal plane array 42 (step 102). The image that is produced is generally an image of reference marks, or dots, which are produced when the converging light beam, or beams, 40 hits the specimen 28 and does not include any of the details of the specimen itself. In another embodiment, details of the specimen 28 can also be included in the image. Examples of different images are shown with respect to FIGS. 2 and 3.

The reflected light beams 46 are reflected off the beam splitter 18 through the optical port 16 and then back into the sensor 12 via the second lens 32. This second lens 32, acting as a tube lens, forms, via known methods, the image that was illuminated when the converging light beam, or beams, 40 reflected off the specimen 28. The light beams representing the image, are then directed towards the beam splitter 38 which directs them towards the focal plane array 42 where the image is formed and can then be reviewed by the processor 23 (step 104). If multiple light beams are used, such as shown in FIG. 1e which is a top view of a specimen having multiple dots on its surface, the processor 23 selects one or more usable dots. Digital image processing (DIP) can be used to determine which of the dots are usable and which are corrupted. An example of this process will be described below with respect to FIG. 1e. This provides an advantage in that corrupted dots can be ignored and only information from usable dots, captured by the processor 23.

The processor 23 processes the image to retrieve characteristics, or calibration measurements, of the image, such as the size of various portions of the image or the intensity of light at certain areas of the image. After processing the image, a set of focusing measurements, such as a radius of the image or a centre of gravity (COG) value, is calculated (step 104) based on the characteristic, or calibration, measurements. A more detailed description of the calculation of the COG value is described below with respect to FIGS. 3a and 3b. The set of focusing measurements is then used to determine direction and distance measurements for the electro-servo motor 14 to move the microscope 10 (step 106) to focus the microscope 10. The direction and distance measurements are then transmitted by the processor 23 to the electro-servo motor 14 (step 108). After receiving the measurements, the electro-servo motor 14 focuses the microscope 10 by moving the microscope 10. In order to more clearly focus the microscope, steps 100 to 108 can be iteratively performed.

FIG. 1e provides a schematic top view of a specimen, such as a TFT array with a plurality of dots, representative of light beams hitting its surface. As shown, multiple dots, as a result of passing the light beam, or light beams, through the diffraction grating 35, are located on the surface. Some of the dots are corrupted since they are located at areas of the rapid transition of highly reflective material—such as chromium trace—and poorly reflective material—such as indium this oxide electrode.

By converging the light at multiple locations 50, indicated as 50a, 50b, 50c, 50d, 50e and 50f in FIG. 1e, the image, having multiple calibration measurements, displayed on the focal plane array 42 can be used to determine the direction and distance measurements to focus the microscope 10. By having a multiple set of calibration measurements, more accurate measurements can be obtained for use in determining the distance and direction measurements since the calibration measurements can be averaged or a mean or median value of the multiple calibration measurements used.

By including a digital processing (DIP) apparatus within the processor 23, or as a separate component of the sensor 12, the dots within the image which are distorted can be discarded and only the clear images used to determine the calibration measurements. The DIP includes apparatus, or means, for determining which dots are corrupted and which are usable.

If the converging light beam 40 is directed close to one of a plurality of reflective metal traces 60, or at an area of transition between two different materials, as shown by dots 50b and 50f in FIG. 1e, a deformed, or distorted, dot or image portion is displayed on the focal plane array 42. However, if, as shown in FIG. 1e, the converging light beam 40 is directed to an area away from the highly reflective metal traces 60, or solely within an area of only one material, as shown by dots 50a, 50c, 50d, and 50e, a dot, or image portion, is displayed on the focal plane array 42. In this manner, only one image capture is required to retrieve the COG value even though multiple dots are used. After determining the usable image portions, the COG value is calculated for each of the image portions and the calibration measurements used determine the direction and distance measurements to focus the infinity corrected microscope Turning to FIGS. 2a and 2b, further diagrams showing the converging light beam 40 contacting the specimen 28 are shown. The objective lens 20 of the microscope 10 is also shown. In the follow description, the converging light beam 40 is discussed in the singular, however, it will be understood that if there are a plurality of light beams, multiple converging light beams exist and operate in an identical manner.

After the converging light beam 40 exits the microscope objective lens 20, the half cone-shaped light, having the height h, is directed towards the specimen 28. The specimen 28 can be located in three locations with respect to the height of the converging light beam 40.

The first location, as illustrated by specimen 28b, is at a distance h away from the objective lens 20 whereby the converging light beam 40 is focused at a single point on the specimen 28. The second location, as illustrated by specimen 28a, is at a distance less than h away from the objective lens 20 whereby the converging light beam 40 contacts the specimen 28 in a semicircular pattern to the right of the optical axis 43 of the objective lens 20. The third location, as illustrated by specimen 28c, is at a distance greater than h away from the objective lens 20 whereby the converging light beam 40 contacts the specimen 28 in a semicircular pattern to the left of the optical axis 43 of the objective lens 20. As will be understood, the position of the converging light beam 40 when it exits the objective lens 20 determines the positioning of the semicircular pattern, or halo, in the image. The converging light beam 40 always exits from the same location so that the positioning of the resultant images used for focusing the microscope 10 are standardized and therefore the direction measurements can be easily determined.

If multiple light beams are used, multiple dots, or semicircular portions, are visible within the image. Each of the dots can represent an image portion.

Figures 2A, 2B:
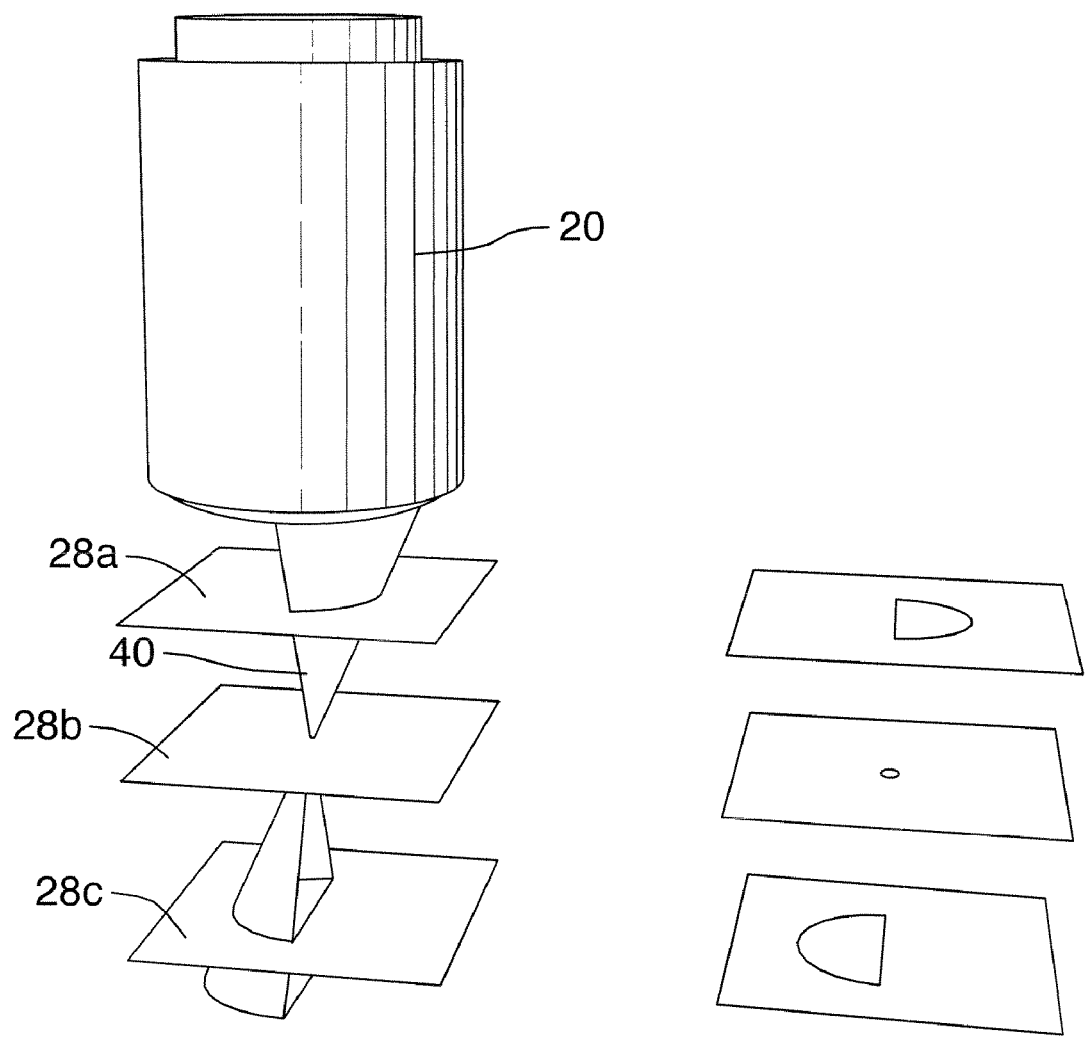

The contact point of the converging light beam 40 on the specimen 28 is more clearly shown in the corresponding set of images in FIG. 2b with respect to the three separate locations. As discussed above, the converging light beam 40 is reflected off the specimen 28 and travels back through the objective lens 20, as reflected light beams 46, to the focal area array 42 so that the image of the specimen 28 being illuminated can be used to calculate calibration measurements to focus the microscope 10. The image can also be used to review the specimen 28 to determine if there are any flaws.

As will be understood by one skilled in the art, the most focused image is realized when the specimen 28 is placed in location one and therefore the microscope 10 is determined to be in focus. For the other two locations, a broader spectrum, including the semi-circular patterns, can be seen with less detail available in the image. However, as will be described below, images taken at each of these other two locations can also be used to assist in providing calibration measurements to focus the microscope 10.

Figure 3A:
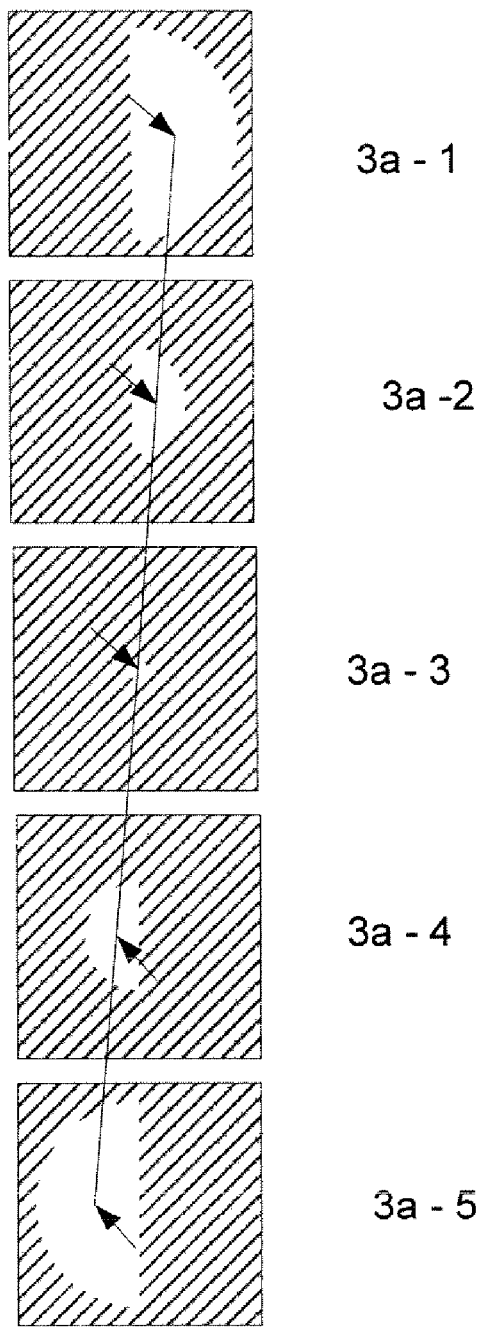
FIG. 3a is a set of images as viewed on a focal plane array.

Turning to FIG. 3a, a set of independent images 3a-1 to 3a-5 showing illuminated areas of the specimen for use in auto-focusing the microscope is provided. As will be understood, in this example, five separate images are shown. As will be understood, only one of the images is required to determine the distance and direction measurements so that the infinity corrected microscope can be automatically focused. In order to determine the distance and direction measurements, characteristics of the image such as, but not limited to, energy per unit area, image area and image width or height are used to determine the calibration measurements.

As with FIG. 2a, the converging light beam 40 exits the objective lens 20 on a right hand side of the lens 20 such that the two images (3a-1 and 3a-2) are provided when the specimen 28 is illuminated at two different distances which are less than the height of the converging light beam 40 (location two); the middle image (3a-3) is provided when the specimen 28 is illuminated at a distance equal to the height of the converging light beam 40 (location one) and the two images (3a-4 and 3a-5) are provided when the specimen 28 is illuminated at two different distances which are greater than the height of the converging lens 40 (location three).

In order to determine the distance and direction measurements to focus the microscope 10, various calculations are performed. In one embodiment, the centre of gravity (COG) value is calculated by the processor 23 using the image. The arrows in each of the images of FIG. 3a point to the COG value for each of the images.

Figure 3B:
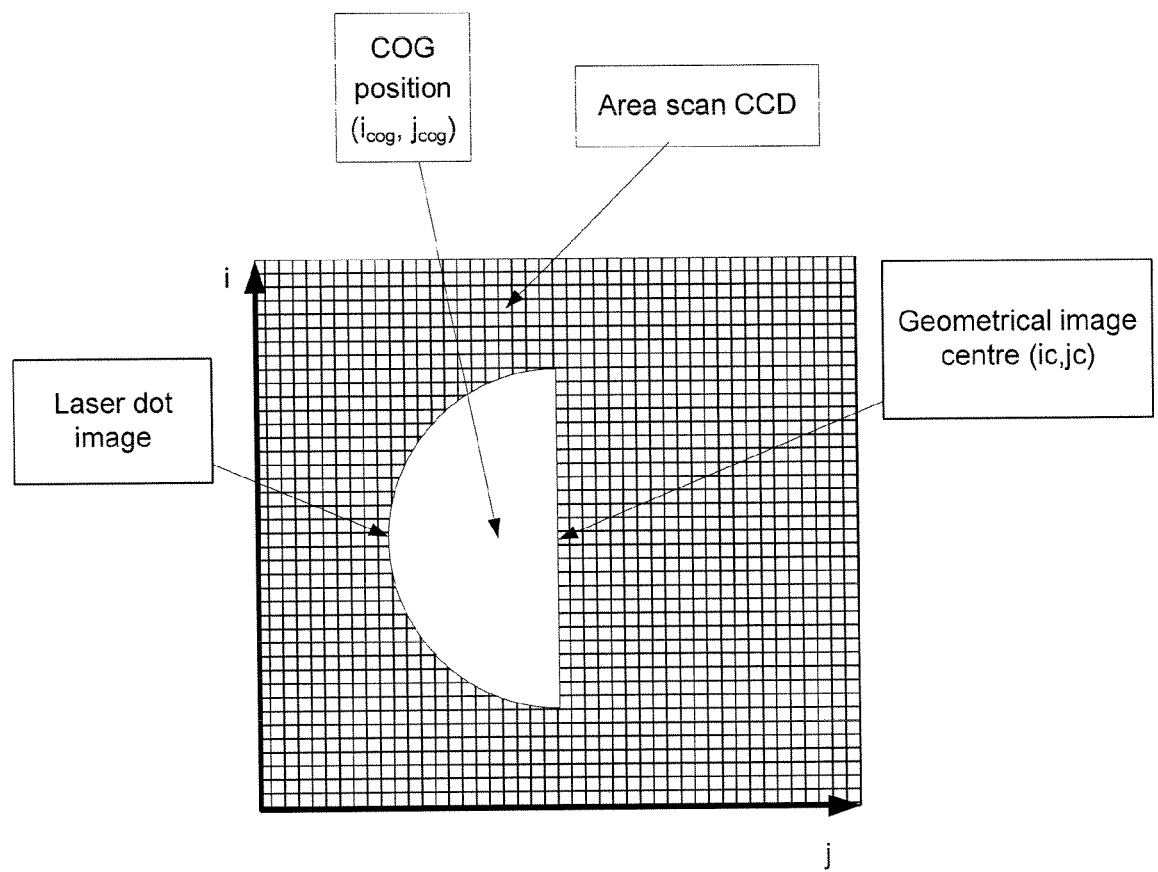
FIG. 3b is a diagram of a centre of gravity (COG) image.

One method of calculating the COG value will now be described, with respect to FIG. 3b which illustrates an image on the focal plane array 42 which is similar to image 3a-5. FIG. 3b shows an image where only one light beam has been reflected off the specimen.

The COG value is calculated with reference to the centre of the focal plane array 42 which is mapped to a graph. The viewing area of the focal plane array 42, as schematically illustrated by the graph, has two axes, which are labeled as i and j. The reference dot image is then mapped, or displayed, on the graph.

The centre of this focal plane array 42 is denoted as $(i_c, j_c)$ and represents the expected COG value when the microscope 10 is in focus such that the objective lens 20 is a distance h away from the specimen 28.

The coordinates of the COG for the image, denoted as $i_{cog}$, $j_{cog}$, are computed as follows.

$$i_{cog} = \frac{\sum_{i=0}^{i_{max}} \sum_{j=0}^{j_{max}} (i - i_c) P_{ij}}{\sum_{i=0}^{i_{max}} \sum_{j=0}^{j_{max}} P_{ij}}$$

$$j_{cog} = \frac{\sum_{i=0}^{i_{max}} \sum_{j=0}^{j_{max}} (j - j_c) P_{ij}}{\sum_{i=0}^{i_{max}} \sum_{j=0}^{j_{max}} P_{ij}}$$

where $j=1,\ldots j_{max}$ where j is the column number and $j_{max}$ is the total number of columns; and $i=1,\ldots i_{max}$ where i is the row number and $i_{max}$ is the total number of rows. $P_{ji}$ denotes image intensity registered by a pixel at the crossing of the column j and row i. By calculating the intensity value at each intersection point, a more accurate COG reading can be obtained.

The $j_{cog}$ value is computed in pixel units and is proportional to the distance measurement required to focus the microscope 10. Since the converging light beam 40 is transmitted through the objective lens 20, this relationship is linear. The $i_{cog}$ value coordinate does not evolve with changing distance to focus and is computed for error checking only.

After determining the $j_{cog}$ value, this value is then multiplied by a conversion factor to change the pixel unit value to a distance value, in micrometers, so that the distance measurement can be determined. As will be understood, this conversion factor is determined by various measurements with respect to the sensor and various other measurements involving the vertical position of the microscope 10. The calculation, or determination, of this conversion factor is well known to one skilled in the art.

In another embodiment of the invention, the calibration measurement can be the radius of the halo, ghost, or semi-circular image. In this manner, the length of the radius is determined and then multiplied by a conversion factor, which can be identical or different from the conversion factor discussed above, to determine the distance measurement in order to focus the microscope 10.

In the current example, when the microscope 10 is in focus, the image is a small almost round dot around the geometrical centre, such as image 3a-3, the computed COG value equals (0,0)—an indication that focus has been reached or that the specimen 28 is at a distance h away from the objective lens 20.

Use of the COG value is preferred as this requires multiple measurements and provides a more accurate distance measurement than using a single radius measurement.

In the case where multiple light beams are used, COG values are calculated for each of the image portions and the COG values averaged in order to obtain a more accurate overall COG value.

Figure 3C:
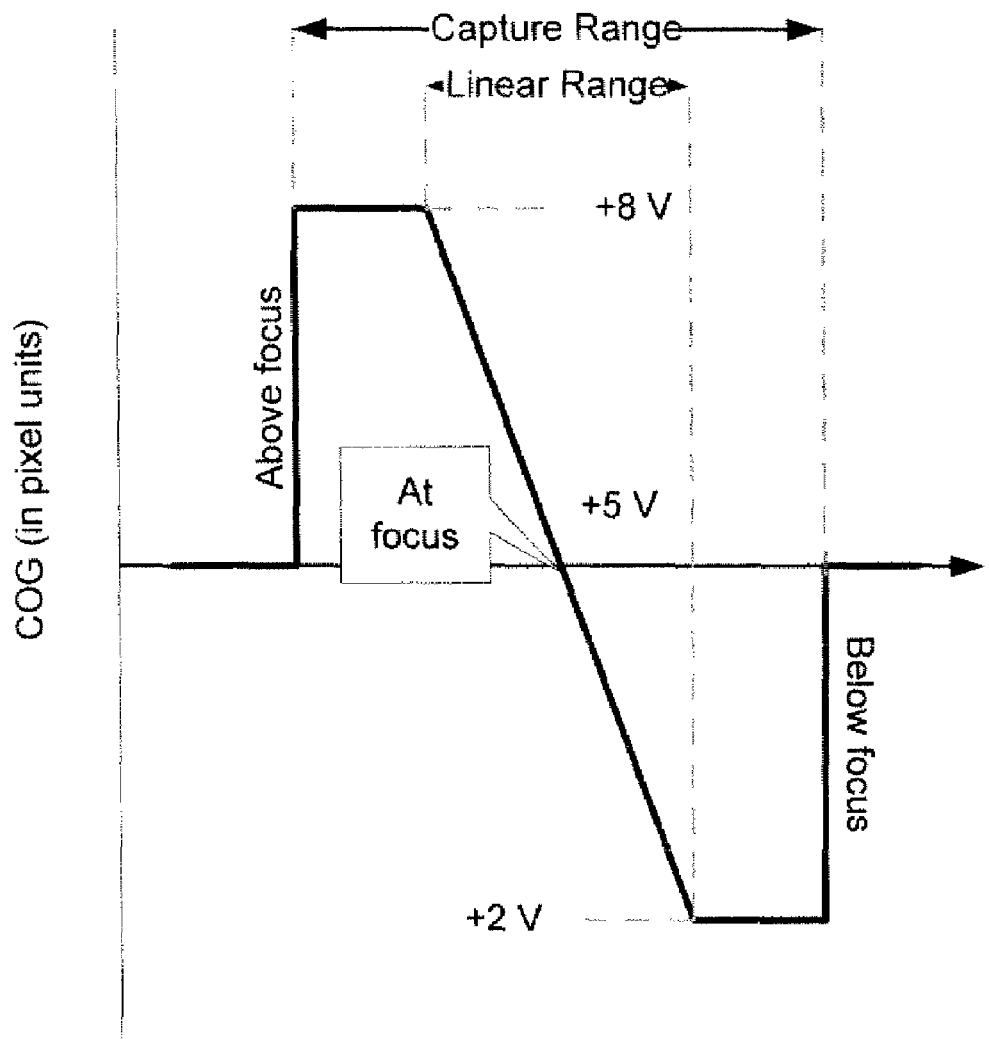
FIG. 3c is a graph of COG values vs distance of objective lens from the specimen.

FIG. 3c provides a sample graph illustrating the COG value (in pixel units) vs the distance away from the geometrical centre of gravity. Since the image is produced by transmitting light through the objective lens 20, the relationship between the COG value and the distance measurement to focus the microscope 10 is linear. Therefore, the distance between the geometrical image centre and the COG value can be multiplied by a conversion factor and then used to determine the distance and direction measurements.

The direction measurement is typically determined by digital image processing which determines which side the semi-circular image is and then determines if the image is at a distance less than, equal to or greater than h.

In another embodiment, with respect to the direction measurement, if the COG value, in pixel units, is above a predetermined threshold voltage, the specimen is determined to be less than a value of h away from the objective lens and therefore the objective lens has to be moved away from the specimen 28. Alternatively, if the COG value, in pixel units, is below a predetermined threshold voltage, the specimen is determined to be more than a value of h away from the objective lens and therefore the objective lens and the specimen 28 have to be moved closer together. If the COG value equals the predetermined threshold voltage, the specimen is determined to be in focus and no adjustment is required.

In some instances, the objective lens 20 of the microscope 10 can be at such a distance away from the specimen 28 that a distance measurement is unnecessary, however the direction measurement is still required in order to move the microscope 10 in an appropriate direction to obtain a follow-up image to determine updated direction and distance measurements.

Turning back to FIG. 3a, if an initial image is the top image 3a-1, the COG value is calculated and then the microscope 10 moved accordingly. This calculated COG value allows the microscope 10 and the specimen 28 to be positioned farther away from each other in order to improve the focus of the microscope 10. As indicated above, image 3a-1 is created when the specimen is at a distance less than h away from the objective lens 20 and the microscope 10 has to be moved away from the specimen 28 in order to more clearly focus the microscope 10. The auto-focusing is a continuous process until $J_{cog}$ is equal to 0. In order to verify if the specimen is in focus, a second image is retrieved, such as the second image 3a-2. The COG value is then calculated for this image and the microscope 10 and the specimen 28 positioned with respect to each other improve the focus of the microscope 10. A third image is then retrieved, such as image 3a-3, and the COG value calculated. In this situation, as described above, the COG value is equal to the geometrical centre of the focal plane array 42 and therefore, the microscope 10 is in focus. Therefore, there is no need to further move the microscope 10 and the processor 23 transmits a value of 0 for the direction measurement and a value of 0 for the distance measurement so that the electro-servo motor 14 does not move the microscope 10. However, even after the microscope is deemed to be focused, images are continuously obtained and COG value calculations performed in order to ensure that the microscope 10 stays in focus. Therefore, the calibration process continues and the distance and direction measurements equal zero as long as the microscope 10 stays in focus. In another embodiment, if the microscope 10 is in focus, no signals are transmitted to the motor 14.

In an alternative embodiment, after the distance and direction measurements are calculated, an updated distance measurement, which is a percentage of the calculated distance measurement, in order to ensure that the microscope 10 does not overshoot the focal point. This means that if the microscope 10 is at a distance less than h away from the specimen 28, the microscope 10 is not moved to a position where the microscope 10 is more than a distance h away from the specimen.

Figure 5B:
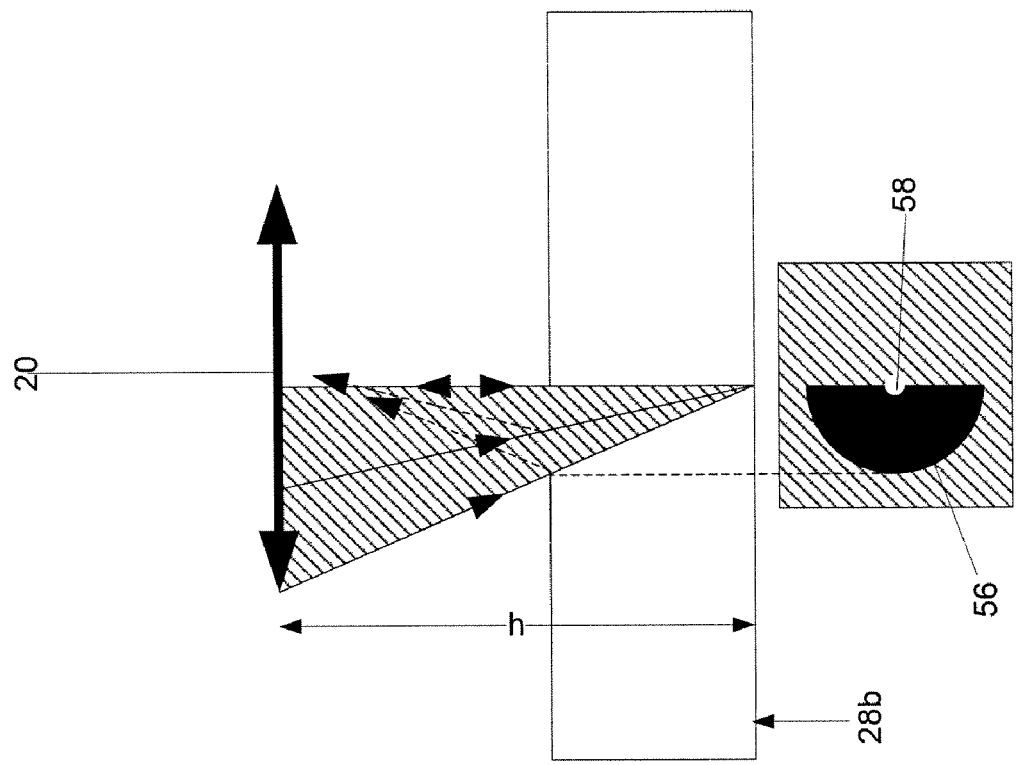
FIGS. 5a and 5b are schematic diagrams converging light on a glass specimen having a top and a bottom surface.
Figure 5A:
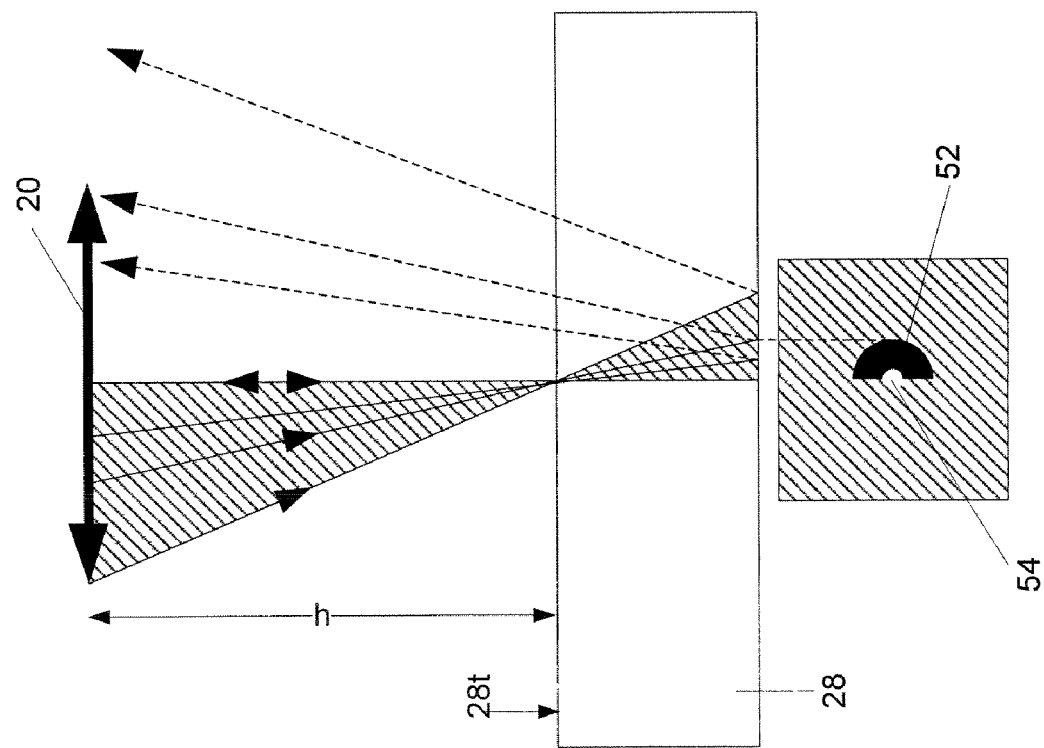
Figure 5C:
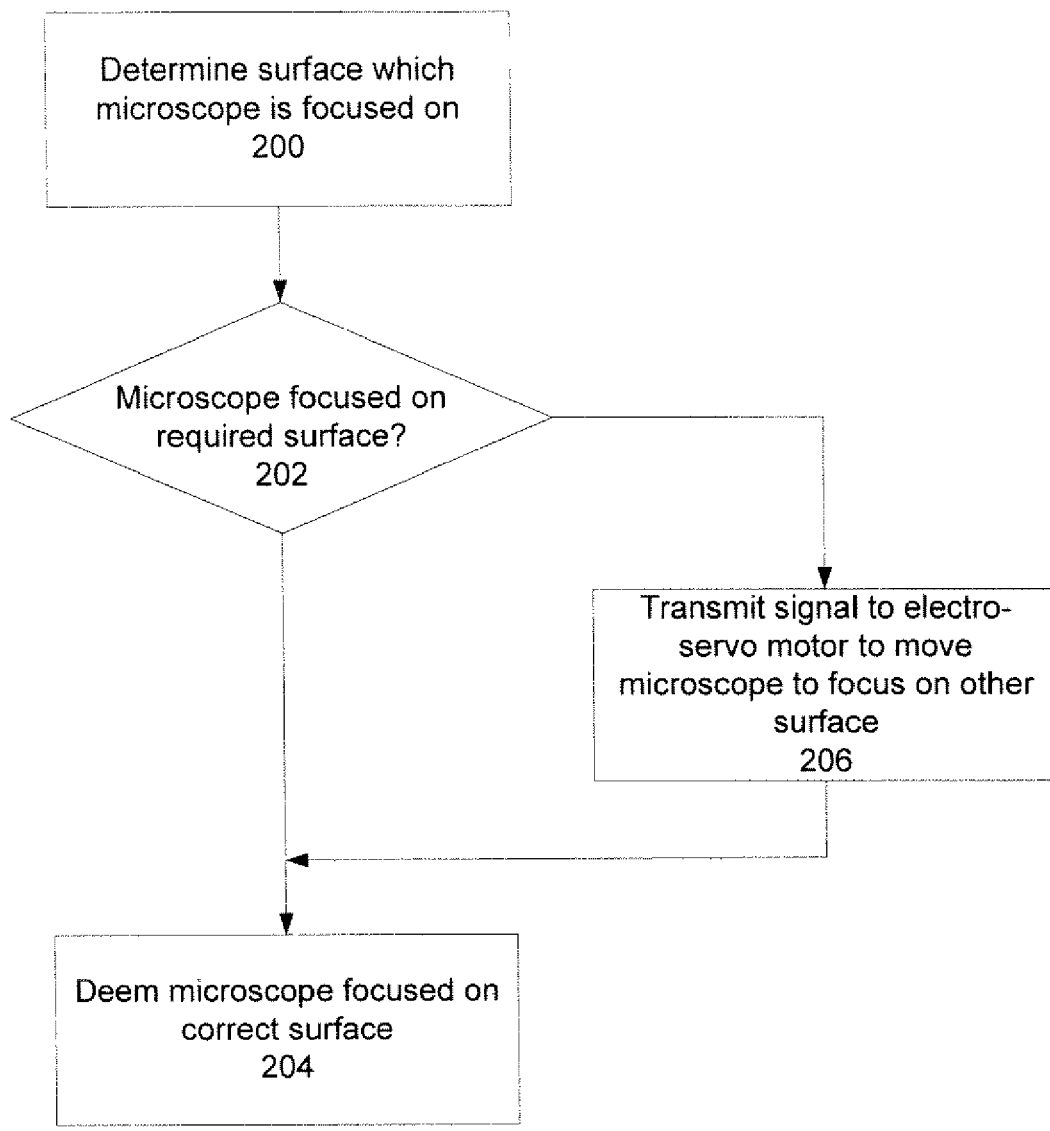
FIG. 5c is a flowchart outlining a method of determining if a microscope is focused on a correct surface.

Turning to FIGS. 5a to 5c, another aspect of the invention is shown. When dealing with certain applications involving thin film transistor (TFT) inspection and/or repair, such as cell or module, the apparatus 12 can be used to determine which surface the microscope is focused on and if this is the surface required by a user. These steps are further reflected in FIG. 5c and are preferably executed after the microscope 10 has been fully focused on the specimen 28. This embodiment finds use when top 28t and bottom 28b surfaces of a specimen 28, such as a sheet of thin glass, are transparent and misleading images can be obtained. As shown, FIGS. 5a and 5b are directed at the area underneath the objective lens 20 of the microscope 10.

Specifically in field of TFT inspection and/or repair, the substrates of the TFT, or specimen, are thin. As a result, the image that is produced at the focal plane array 42 provides images from both surfaces 28b and 28t of the specimen 28 thereby causing the image to include a superimposed, or ghost or halo, portion since there is a reflection from either the top 28t or the bottom 28b surface when the converging light beam 40 is focused on the opposite surface. This is more clearly shown in FIGS. 5a and 5b.

FIG. 5a provides a view when the top surface 28t of the specimen 28 is located a distance h away from the microscope objective lens 20 while FIG. 5b provides a view when the bottom surface 28b of the specimen 28 is located a distance h from the microscope objective lens 20.

As can be seen in the image corresponding to FIG. 5a, the image which is viewed on the focal plane array 42 includes the ghost image reflected off the bottom surface 28b and similarly, for FIG. 5b, the image which is viewed on the focal plane array 42 includes the image reflected off the top surface 28t of the specimen 28.

In the image for FIG. 5a, the reflection of the converging light beam 40 off the bottom surface 28b of the specimen 28 produces the halo, or ghost, portion 52 displayed on the focal plane array 42 surrounding a dot 54 representing the image where the converging light beam 40 reflects off the top surface 28t of the specimen 28.

Similarly, in the image for FIG. 5b, the reflection of the converging light beam 40 off the top surface 28t of the specimen 28 produces a halo 56 surrounding a dot 58 representing the image reflected off the bottom surface 28b.

Turning to FIG. 5c, once the microscope 10 has been focused on the specimen 28, the processor 23 validates, or determines which surface, 28t or 28b, the microscope 10 is focused on (step 200). Use of the superimposed images, can infer or validate on which surface the microscope 10 is focused such as by determining the placement of the halo portion with respect to the dot. As can be seen in the image figures, the halos 52 and 56 are on opposites sides of the dots 54 and 58. All that is required is for the processor 23 to understand is which side the converging light beam 40 is exiting the objective lens 20.

Alternatively, the processor 23 includes a surface validation algorithm which is executed using calibration measurements which were retrieved earlier from the image or using calibration measurements which are retrieved from the image just prior to the execution of the validation algorithm. The result of the executed validation algorithm is then processed to determine whether or not the microscope 10 is focused on the surface required by the user (step 202).

If the microscope is focused on the right surface, the microscope 10 is deemed to be focused on the correct surface (step 204). Alternatively, if the microscope is not focused on the right surface, the processor 23 transmits a signal to the electro-servo motor 14 (step 206) to move the microscope 10 to have the microscope focused on the correct surface. This signal includes a direction measurement such as upwards, from the bottom surface 28b to the top surface 28t, or downward, from the top surface 28t to the bottom surface 28b. The signal also includes a distance measurement representing the thickness of the glass. The thickness of the glass can be pre-stored within the processor 23 or retrieved from a database accessible by the processor 23. In this manner, once it is determined that the microscope 10 is focused on the wrong surface, the error can be quickly rectified. The microscope 10 is then moved accordingly and the microscope 10 is determined to be focused on the correct surface (step 204).

In a further embodiment, assuming that the microscope 10 is close to being in focus and multiple light beams are used such that multiple dots are reflected in the image, the intensity of each dot is not likely to be the same. Therefore, the intensity of the light source 24 can be adjusted to adopt a nominal value such as three-quarters of the dynamic range of the focal plane array 42 so that all dots appear identical and a more accurate COG measurement can be obtained. This also prevents saturation of the image which information to disappear.

Another advantage of the invention, when used in the inspection and repair of large media, is that the microscope 10 remains in focus as the microscope 10 passes from one specimen 28 the next. Since the invention performs its focusing with dots which are provided by the sensor 12, as long as the specimens are located at a same distance away, the microscope 10 remains in focus. There is no need to re-calibrate the microscope 10 when passing from one specimen 28 to another and so operation of the optical microscope is not delayed or caused to be idle. Current AF apparatuses need to be refocused on every different specimen 28 which results in unwanted time delays which extend operation and repair time.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of auto-focusing an infinity corrected microscope on a specimen comprising:
    creating an image of said specimen;
    processing the image, using digital image processing (DIP), to determine usable and non-usable calibration measurements;
    calculating a distance measurement based on the usable calibration measurements;
    calculating a direction measurement based on the usable calibration measurements; and
    transmitting the distance and direction measurements to a motor to move the microscope in accordance with the distance and direction measurements.

2. The method of claim 1 wherein the step of creating comprises:
    transmitting light at the specimen;
    receiving reflected light from the specimen;
    forming an image of the specimen based on the reflected light; and
    acquiring the image formed on the focal plane array for processing.

3. The method of claim 2 wherein the step of transmitting light comprises:
    providing light beams from a light source;
    bisecting the light beams to produce a bisected portion;
    collimating the bisected portion; and
    converging the collimated bisected portion at the specimen.

4. The method of claim 3 wherein the bisected portion comprises half cone shaped light beams.

5. The method of claim 2 wherein the step of forming is performed via a tube lens.

6. The method of claim 1 wherein the step of calculating the distance measurement comprises:

mapping the image on a graph representing a focal plane array;
    calculating a centre of gravity value for the image; and
    setting a portion of the centre of gravity value as a distance measurement.

7. The method of claim 1 wherein the step of calculating the direction measurement comprises:
    determining a voltage measurement, based on intensity of pixels within the image;
    comparing a voltage measurement with a predetermined threshold; and
    determining the direction measurement based on the step of comparing.

8. The method of claim 1 further comprising:
    validating if the microscope is focused on a correct surface of the specimen; and
    moving the microscope to another surface of the specimen if the microscope is focused on the wrong surface.

9. The method of claim 8 wherein the step of validating comprises:
    executing a validation algorithm based on the usable calibration measurements; and
    processing a result of the validation algorithm to determine if the microscope is focused on the correct surface.

10. Apparatus for use in auto-focusing an infinity-correct microscope on a specimen comprising:
    a sensor including:
        a light source for providing a plurality of light beams;
        a plurality of optic elements for producing a converging light and directing the converging light at the specimen and for creating an image based on light reflected off the specimen as a result of the directed converging light;
        a focal plane array for displaying the image; and
        a processor for calculating auto-focusing measurements, using digital image processing (DIP) for determining usable and unusable calibration measurements, for the infinity corrected microscope based on the image.

11. The apparatus of claim 10 wherein the plurality of optic elements comprise:
    a first lens for diverging the light into a first portion and a second portion;
    a second lens;
    a steering mirror for directing the first portion of the bisected light towards the second lens; and
    a converging apparatus for converging the bisected light into a half cone.

12. The apparatus of claim 11 further comprising a stop aperture for receiving the second portion of light for bisecting the second portion of light.

13. The apparatus of claim 10 further comprising:
    a motor for moving the microscope in accordance with the auto-focusing measurements to focus the microscope.

14. A method of auto-focusing an infinity-corrected microscope on a specimen comprising: determining, using digital image processing (DIP), if the microscope is focused on a desired surface; and focusing the microscope on the desired surface if the microscope is not focused; wherein the step of determining comprises:
    directing a light beam at the specimen;
    retrieving a superimposed figure of an image of the light reflecting off the specimen; and
    locating placement of a halo with respect to a dot within the superimposed figure;

wherein if the halo is to a right of the dot, determining that the microscope is focused on a top surface of the specimen and if the halo is to the left of the dot, determining that the microscope is on a bottom surface of the specimen.

15. The method of claim 14 further comprising:
comparing the determined surface with the desired surface; and
moving the microscope to a predetermined location if the determined surface does not equal the desired surface.

16. The method of claim 14 wherein the step of determining further comprises:
performing a surface validation algorithm based on previously collected calibration measurements.

17. The method of claim 14 wherein the step of receiving comprises:
receiving a reflection of the light off of the specimen at a microscope objective lens; and
transmitting the reflection to a focal array plane to produce a display image.

18. The method of claim 14 wherein the step of locating comprises:
processing the display image to determine location of the halo.

19. The method of claim 18 wherein the step of processing comprises:
calculating a centre of gravity (COG) position; and
determining position of halo based on the COG position.

20. The method of claim 18 wherein the COG position includes an i component and j component, wherein $$i_{cog} = \frac{\sum_{i=0}^{i_{max}} \sum_{j=0}^{j_{max}} (i - i_c) P_{ij}}{\sum_{i=0}^{i_{max}} \sum_{j=0}^{j_{max}} P_{ij}}$$

$$j_{cog} = \frac{\sum_{i=0}^{i_{max}} \sum_{j=0}^{j_{max}} (j - j_c) P_{ij}}{\sum_{i=0}^{i_{max}} \sum_{j=0}^{j_{max}} P_{ij}}$$

where Pij=image intensity at a position of (i, j).

21. The method of claim 18 wherein the step of locating comprises:
comparing the calculated COG position with an expected COG position to determine location of halo.

* * * * *